(12) United States Patent
Kim et al.

(10) Patent No.: US 8,772,652 B2
(45) Date of Patent: Jul. 8, 2014

(54) KEYPAD ASSEMBLY FOR PORTABLE TERMINAL

(75) Inventors: Byung-Sun Kim, Seoul (KR); Min-Su Jung, Seoul (KR); Cheol-Hee Kim, Seoul (KR)

(73) Assignee: Samsung Electronics Co., Ltd., Yeongtong-gu, Guwon-si, Gyeonggi-do (KR)

( * ) Notice: Subject to any disclaimer, the term of this patent is extended or adjusted under 35 U.S.C. 154(b) by 517 days.

(21) Appl. No.: 13/117,268

(22) Filed: May 27, 2011

(65) Prior Publication Data

US 2012/0138441 A1 Jun. 7, 2012

(30) Foreign Application Priority Data

Dec. 1, 2010 (KR) .................. 10-2010-0121351

(51) Int. Cl.
*H01H 9/26* (2006.01)

(52) U.S. Cl.
USPC .......................................... 200/5 A

(58) Field of Classification Search
USPC .......... 200/5 A, 510–520, 5 R, 343–345, 339, 200/6 A, 406, 409, 311–314
See application file for complete search history.

(56) References Cited

U.S. PATENT DOCUMENTS

| 8,124,894 B2 * | 2/2012 | Yasui ............................ 200/5 A |
| 8,227,715 B2 * | 7/2012 | Park et al. ..................... 200/5 A |
| 8,253,046 B2 * | 8/2012 | Chen et al. .................... 200/5 A |

* cited by examiner

*Primary Examiner* — Edwin A. Leon
(74) *Attorney, Agent, or Firm* — Cha & Reiter, LLC

(57) ABSTRACT

A keypad assembly includes an operation member deformed according to user's manipulation to operate key switches, a binding member disposed on a top surface of the operation member, binding pieces extending and bent from the binding member to enclose sides of the operation member on an edge of the binding member, and a manipulation member disposed on a top surface of the binding member, the manipulation member including at least one key tops, in which the binding members are bound onto inner side walls of a housing of the portable terminal.

15 Claims, 7 Drawing Sheets

KEYPAD ASSEMBLY FOR PORTABLE TERMINAL

CLAIM OF PRIORITY

This application claims the benefit under 35 U.S.C. §119 of a Korean Patent Application filed in the Korean Intellectual Property Office on Dec. 1, 2010 and assigned Serial No. 10-2010-0121351, the entire disclosure of which is hereby incorporated by reference.

BACKGROUND OF THE INVENTION

1. Field of the Invention

The present invention relates to a portable terminal, and more particular to a keypad assembly serving as an input device for a portable terminal.

2. Description of the Related Art

Generally, a portable terminal refers to an electronic device which allows a user to perform a voice or data communication or message transmission as well as a multimedia service, such as storage of various information, playing games, and watching video content. The portable electronic device has been manufactured in various forms including an electronic note, a palm Personal Computer (PC), a portable game player, a moving image/music file player, a cellular phone, a notebook PC, etc.

Recently, with integration of an electronic note or multimedia function into a mobile communication terminal such as a cellular phone, a user can now easily enjoy various multimedia services such as a banking service, a game/multimedia service, a simple office work and the like as well as the traditional communication function.

Although a typical mobile communication terminal can perform voice communication or short message generation with a conventional keypad including keys for inputting numbers, send/end keys, a menu key, and a shift key, a need for expanding the keypad to serve more functions is increasing with integration of various functions into the mobile communication terminal. To this end, additional keys may be mounted by reducing the size of each key, but the size reduction of the key may cause input errors. For this reason, a terminal having a QWERTY keypad has emerged in which two housings are coupled and the keypad can be manipulated by positioning the terminal in a horizontal orientation during operation.

Meanwhile, it is difficult to secure a sufficiently large keypad area while minimizing the size of a terminal in terms of portability.

FIGS. 1 through 3 are views showing a portable terminal 100 including a keypad assembly 102 according to an embodiment of the prior art. As shown in FIGS. 1 through 3, the keypad assembly 102 according to an embodiment of the prior art comprises a plurality of key tops 121 on a top surface thereof and is disposed between a front case 101a and a rear case 101b, defining a housing 101 of the portable terminal 100. The front case 101a includes an opening 111 which exposes the keypad assembly 102, more specifically, the key tops 121, and a window 113 for installing a display device (not shown).

The circumference of the opening 111 is in the form of a frame which fixes the keypad assembly 102 within the housing 101 by enclosing the edge of the keypad assembly 102. In an inner side of the front case 101a, fixing protrusions 115 are formed along the circumference of the opening 111. The fixing protrusions 115 extend from the inner side of the front case 101a toward the rear case 101b.

Binding ribs 127 extend from the edge of the keypad assembly 102, more specifically, from the edge of an inner side end of the key tops 121, and binding holes 129 are formed in the binding ribs 127. When the front case 101a is assembled to the rear case 101b on which the keypad assembly 102 is disposed, the fixing protrusions 115 are bound by passing through the engagement holes 129. Hence, the keypad assembly 102 is assembled to be in a predetermined position with respect to the front case 101a, thus being disposed within the opening 111.

In the conventional keypad assembly installation structure described above, when the keypad assembly 102 is installed, it is difficult to sufficiently utilize the area of the front case 101a, particularly, the width of the front case 101a. Referring to FIG. 3, the key tops 121 cannot be disposed on portions D of both side ends of the front case 101a and an available overall width W on which the key tops 121 can be disposed is limited by the portions D of the both side ends of the front case 101a. This is because the area covered by the portions D is used for forming the fixing protrusions 115 for fixing the keypad assembly 102 and for receiving the binding ribs 127 formed on the keypad assembly 102. Therefore, the conventional keypad assembly installation structure has a restriction in securing a wider area for display which is also a drawback in miniaturizing the terminal.

SUMMARY OF THE INVENTION

Accordingly, an aspect of the present invention is to provide a keypad assembly which makes it easy to secure a keypad installation area in a portable terminal.

Another aspect of the present invention is to provide a keypad assembly which makes it easy to secure a keypad installation area, thereby contributing to miniaturization of a portable terminal.

According to an aspect of the present invention, a keypad assembly for a portable terminal includes an operation member deformed according to user's manipulation to operate key buttons, a binding member disposed on a top surface of the operation member, binding pieces bent to enclose sides of the operation member on an edge of the binding member, and a manipulation member disposed on a top surface of the binding member, the manipulation member including at least one key tops, in which the binding members are bound onto inner side walls of a housing of the portable terminal.

According to another aspect of the present invention, a keypad assembly for a portable terminal includes a Printed Circuit Board (PCB) disposed in a housing of the portable terminal and a transferring portion for transferring a key input operation by the user to the PCB, in which the transferring portion may be provided with binding pieces extending down toward the PCB, and the binding pieces may be bound to inner side walls of the housing.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION OF THE INVENTION

Hereinafter, an exemplary embodiment of the present invention will be described in detail with reference to the accompanying drawings. For the purposes of clarity and simplicity, a detailed description of known functions and configurations will be omitted as it may unnecessarily obscure the subject matter of the present invention.

Figure 1:
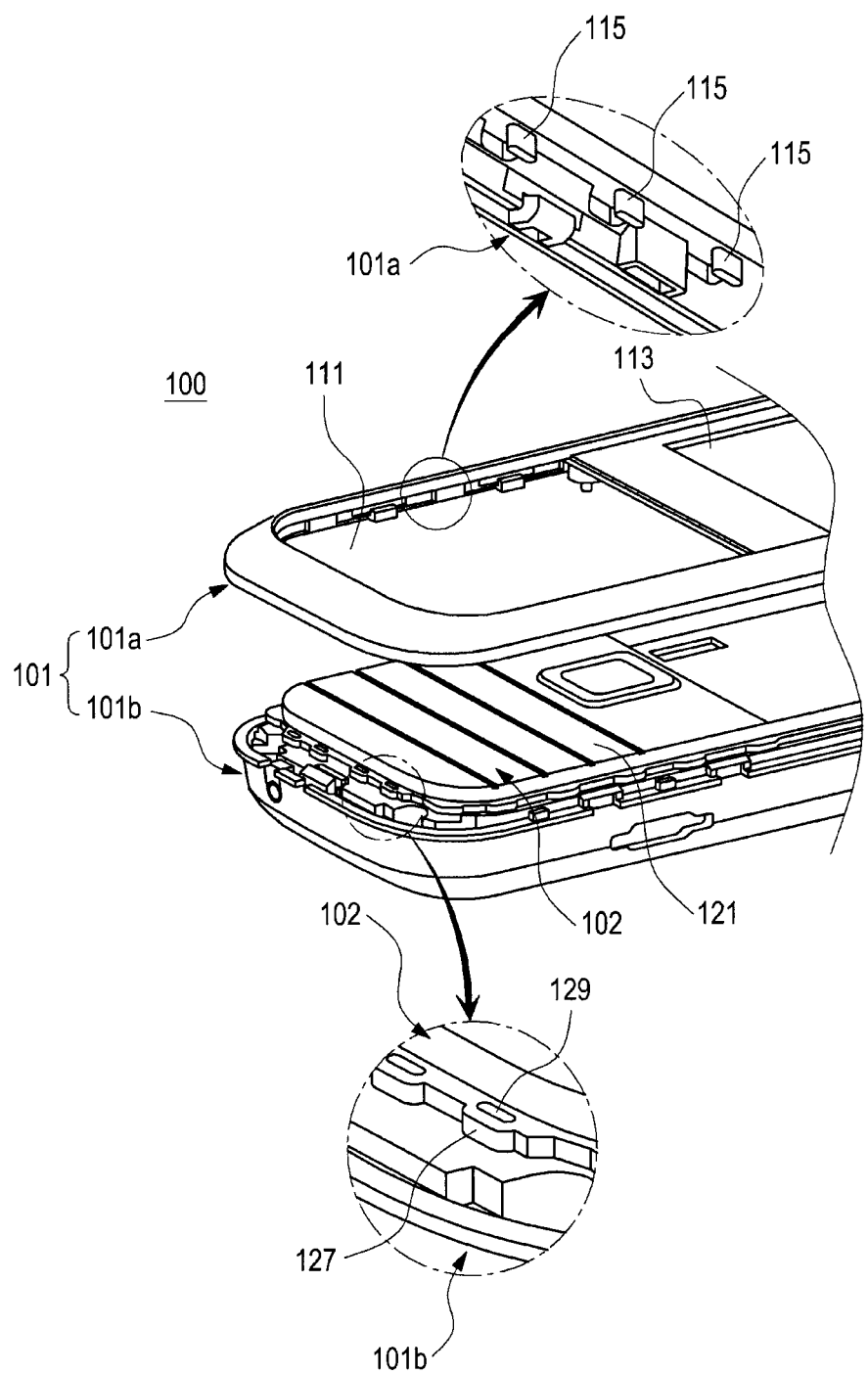
FIG. 1 is an exploded perspective view of a portable terminal including a keypad assembly according to an embodiment of the prior art.
Figure 2:
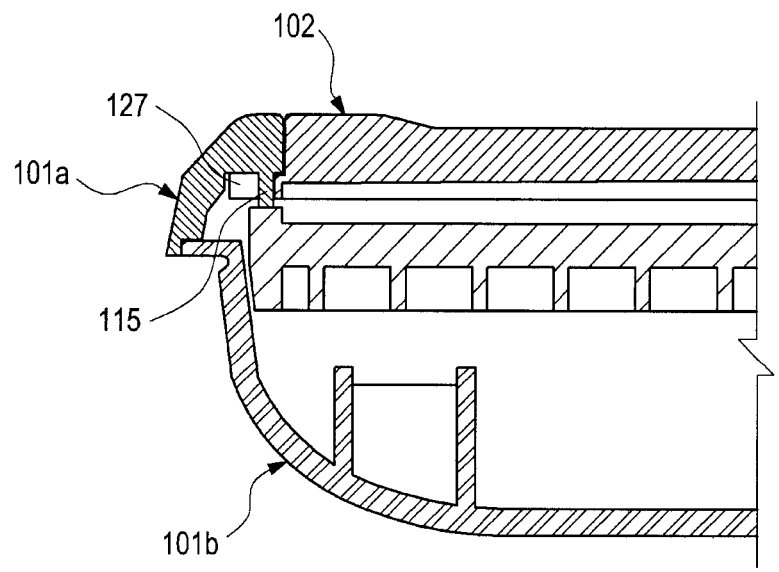
FIG. 2 is a cross-sectional view of an assembly structure of a keypad assembly shown in FIG. 1.
Figure 3:
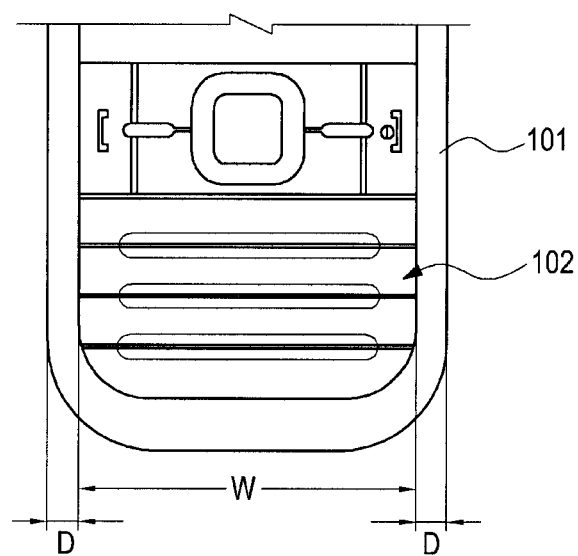
FIG. 3 is a plane view of a portable terminal shown in FIG. 1.
Figure 4:
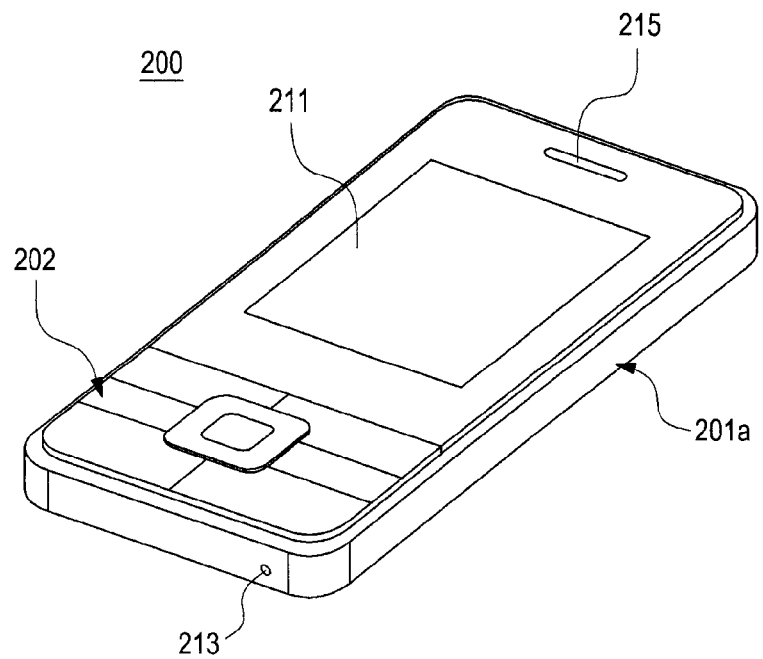
FIG. 4 is a perspective view of a portable terminal including a keypad assembly according to an exemplary embodiment of the present invention.

Referring to FIG. 4, a portable terminal 200 according to an exemplary embodiment of the present invention includes a display device 211 and a keypad assembly 202 which are disposed on a front surface of a housing 201a, in which a receiving portion 215 is positioned above the display device 211 and a transmitting portion 213 is positioned on a lower end surface of the housing 201a. The portable terminal 200 is shown as a bar-type terminal by way of example, but it may be easily understood by those of ordinary skill in the art that the keypad assembly 202 may also be installed in other types of terminals such as a folder type or a slide type. For example, a slide-type terminal may be configured by slidably coupling a separate housing to a rear surface of the housing 201a. In this case, on the keypad assembly 202 may be provided with frequently used keys such as send/end keys, a menu key, a short message key, a camera key, etc., and function keys such as keys for shifting through or selecting menus. Also, a separate housing coupled to a rear surface of the housing 201a may be provided with a keypad for inputting numbers/characters. The keypad for inputting numbers/characters may also be formed by using a structure of the keypad assembly 202 according to the present invention. Meanwhile, as shown in FIGS. 7 and 8, a rear cover 201b is coupled to the rear surface of the housing 201a to close an inner space of the housing 201a.

Figure 7:
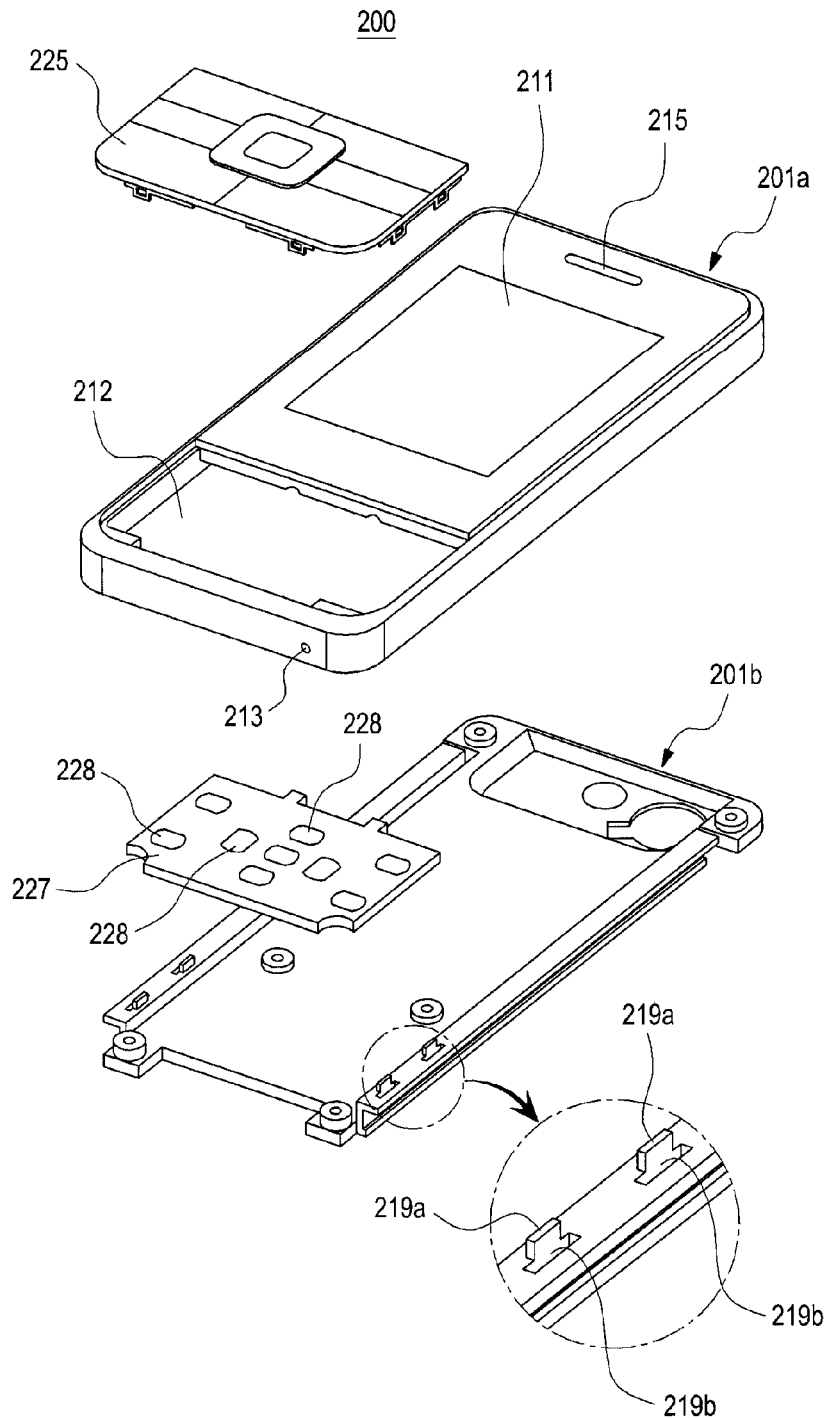
FIG. 7 is a disassembled perspective view of a portable terminal shown in FIG. 4.
Figure 8:
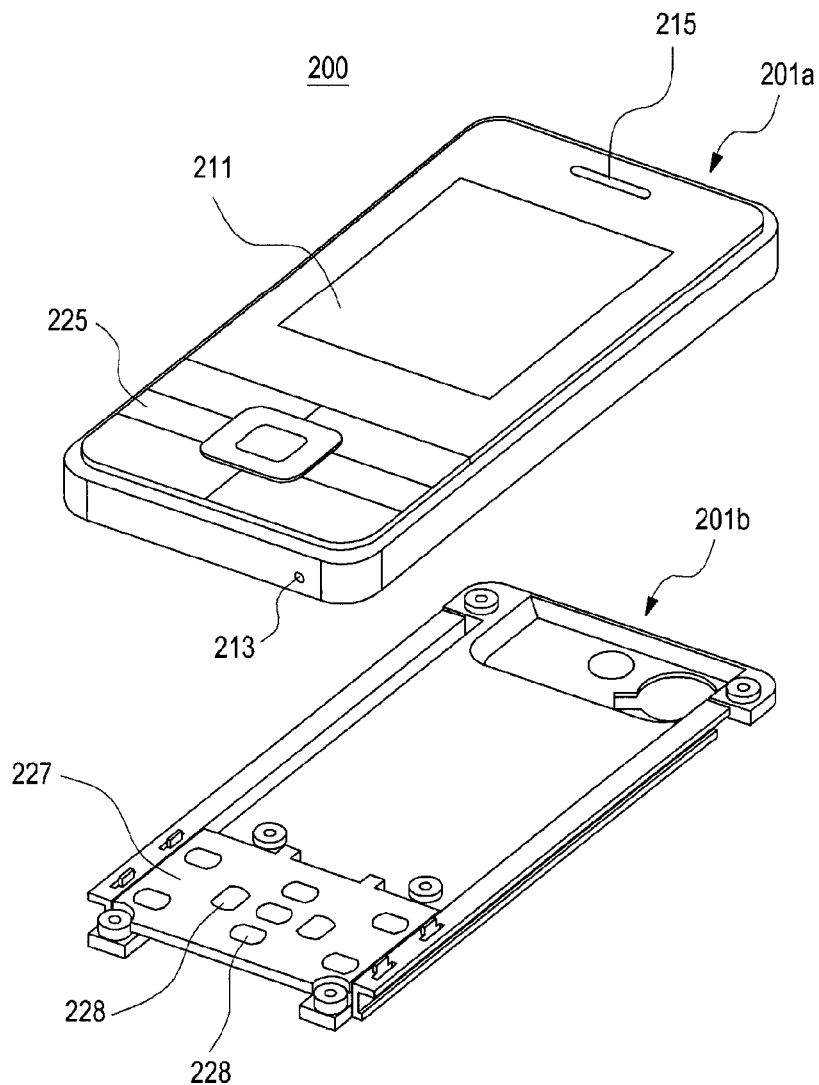
FIG. 8 is a disassembled perspective view in which a portable terminal shown in FIG. 7 is partially assembled.
Figure 9:
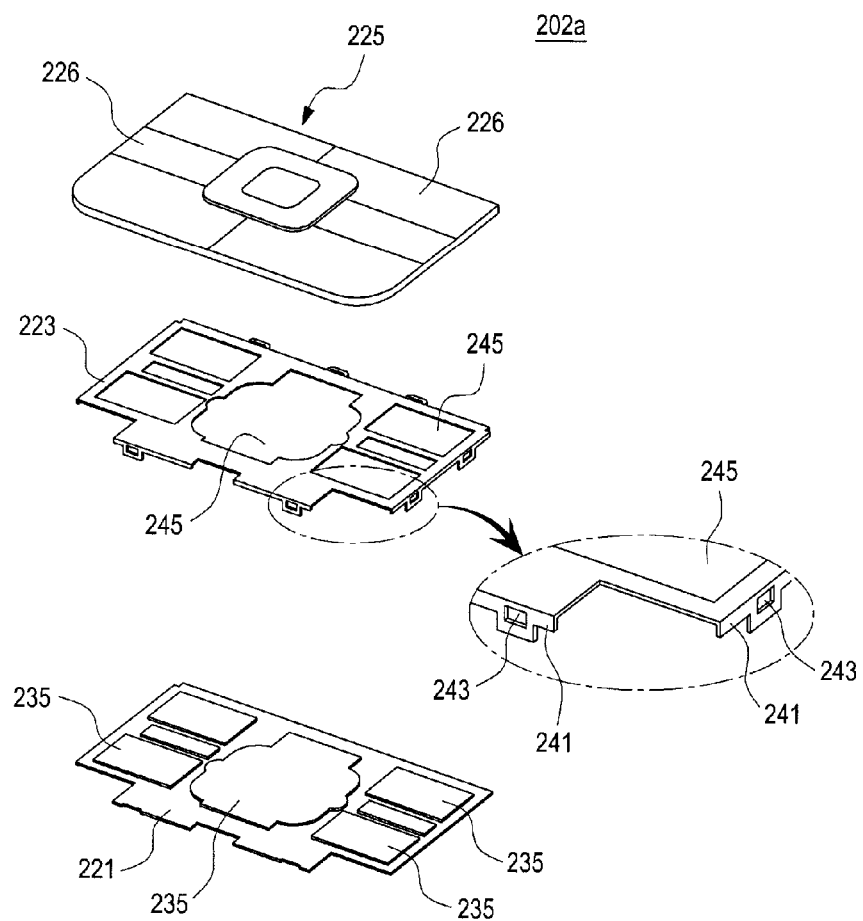
FIG. 9 is a disassembled perspective view of main components of a keypad assembly shown in FIG. 4.

Referring to FIGS. 7 through 9, the keypad assembly 202 includes a Printed Circuit Board (PCB) 227 disposed in the housing 201a, and an operation member 221, a binding member 223, and a manipulation member 225 which are disposed on the PCB 227. The operation member 221, the binding member 223, and the manipulation member 225 form a transferring portion 202a which transfers a user's key input operation to the PCB 227, such that the transferring portion 202a is bound onto the housing 201a by means of the binding member 223.

On the PCB 227 are disposed a plurality of key switches 228 which may be dome switches often used in a known keypad assembly. The PCB 227 is installed inside the housing 201a, while being fixed to the rear cover 201b.

On a surface of the housing 201a is formed an opening (212 shown in FIG. 7) for disposing the keypad assembly 202, more specifically, the transferring portion 202a. As mentioned before, fixing protrusions extending toward a rear case are formed in an inner side of a front case of the housing in a conventional portable terminal, whereas the keypad assembly 202 according to the present invention does not need the fixing protrusions. However, to bind the transferring portion 202a to the housing 201a, binding protrusions (217 shown in FIGS. 5 and 6) may protrude from inner side walls of the housing 201a, more specifically, inner side walls of the opening 212.

The operation member 221 directly manipulates the key switches 228 of the PCB 227 and is manufactured with an elastic material such as silicon or urethane. On a bottom surface of the operation member 221 are formed a plurality of operation protrusions 231 which are disposed to face the key switches 228 and manipulate the key switches 228 according to user's manipulation. However, the operation protrusions 231 may not be in a form shown in FIG. 5 or 6 as long as they protrude from the bottom surface of the operation member 221 by having larger thicknesses than the other portions of the operation member 221 to move outward or inward according to user's manipulation and thus enabling the manipulation of the key switches 228.

The binding member 223 is intended to bind the operation member 221 and the manipulation member 225 to the housing 201a. To this end, the binding member 223 is disposed on a top surface of the operation member 221. The binding member 223 is preferably made of a material having resilience, such that it is not deformed by an external force or can return to its original shape even after deformed. When the binding member 223 is made of a material which is not deformed, it preferably includes a plurality of through-holes (245 shown in FIG. 9) formed in positions corresponding to the operation protrusions 231.

On the edge of the binding member 223 are formed binding pieces (241 shown in FIG. 9) which are formed to enclose sides of the operation member 221 substantially by bending the edge of the binding member 223 and are bound onto the inner side walls of the housing 201, more specifically, inner side walls of the opening 212. To firmly bind the binding member 223 to the housing 201a, a plurality of binding holes 243 is formed in the binding pieces 241, and binding protrusions (217 shown in FIGS. 5 and 6) are formed on the inner side walls of the housing 201a. Once the binding pieces 241 are positioned on the inner side walls of the housing 201a, the binding protrusions 217 are engaged with the binding holes 243, thus binding the operation member 221 and the manipulation member 225 as well as the binding member 223 to the housing 201a. Here, the binding pieces 241 closely contact in parallel with the inner side walls of the housing 201a.

Figure 5:
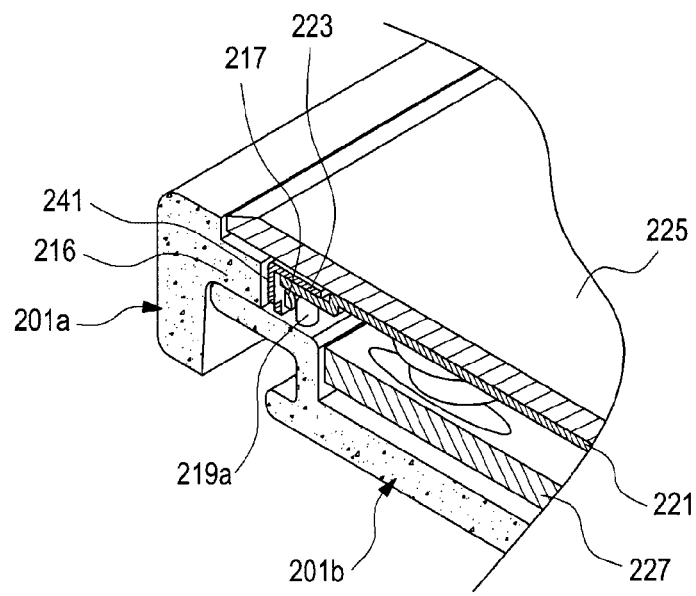
FIG. 5 is a cut-away perspective view of main components of a keypad assembly shown in FIG. 4.

While the binding holes 243 are formed in the binding pieces 241 and the binding protrusions 217 are formed on the inner side walls of the housing 201a to bind the binding member 223 to the housing 201a in the embodiment of the present invention, the end portions of the binding pieces 241 may be bent outward to bind the binding member 223 to the housing 201a. The binding piece 241 extends down toward the PCB 227 when being bound to the inner side wall of the housing 201a as shown in FIG. 5. In this state, if an end portion of the binding piece 241 is bent outward (to the left in FIG. 5) to be engaged between the housing 201a and the rear cover 201b, the binding hole 243 and the binding protrusion 217 may not be necessarily formed.

Figure 6:
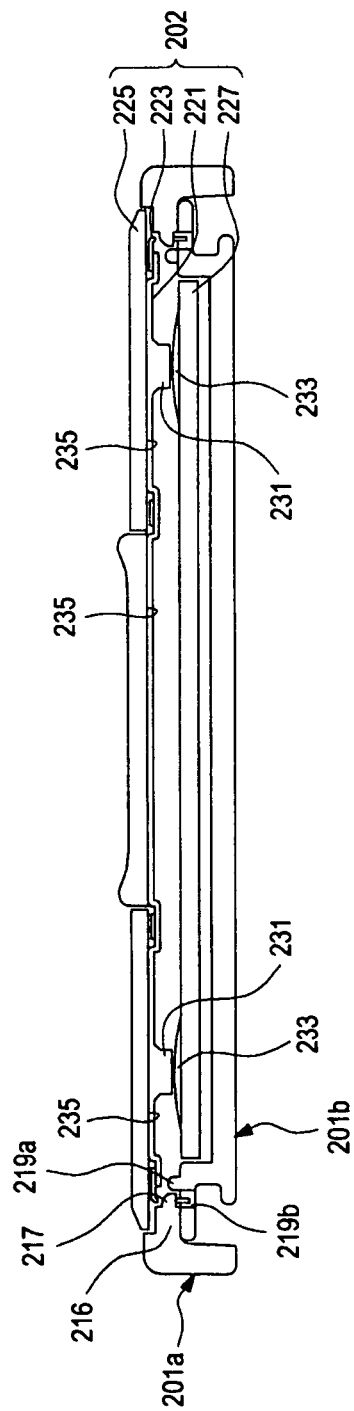
FIG. 6 is a partially cut-away cross-sectional view of a portable terminal shown in FIG. 4.

On the rear cover 201b may be formed support protrusions (219a shown in FIGS. 5 through 7). When the rear cover 201b is coupled to the housing 201a, the support protrusions 219a face the inner side walls of the housing 201a. When the binding member 223 is assembled to the housing 201a, the binding pieces 241 are situated between the inner side walls of the housing 201a and the support protrusions 219a, such that the binding pieces 241, when bound to the binding protrusions 217 or engaged between the housing 201a and the rear cover 201b, are prevented from leaving such binding or engagement.

In the rear cover 201b may be formed avoidance grooves (219b shown in FIGS. 6 and 7) which provide spaces for receiving the binding pieces 241. In positions corresponding to the avoidance grooves 219b, the binding pieces 241 may be formed substantially large to secure a sufficient space for forming the binding holes 243.

The manipulation member 225 is disposed on a top surface of the binding member 223 and includes a plurality of key tops 226 that arranged in positions corresponding to the operation protrusions 231. On the respective key tops 226 are printed characters or symbols having functions assigned thereto, such that the user sees characters or symbols and manipulates a key top to execute a desired function. When the user manipulates the key top 226, the operation member 221 is deformed and the operation protrusion 231 corresponding to the manipulated key top 226 moves to manipulate the corresponding key switch 228. The binding member 223 preferably has rigidity of such a degree that the binding member 223 is not deformed by a force of the user's manipulation.

Meanwhile, to minimize deformation of the binding member 223 in spite of manipulation with respect to the manipulation member 225, a plurality of driving protrusions (235 shown in FIG. 9) is preferably formed on the top surface of the operation member 221. The driving protrusions 235 are received in the through-holes 245 formed in the binding member 223, respectively, and more preferably protrude from the top surface of the binding member 223. The bottom surface of the manipulation member 225 is adhered to the top surfaces of the driving protrusions 235, such that the manipulation member 225 is assembled with the manipulation member 221 and the binding member 223.

A height formed between the top surfaces of the driving protrusions 235 and the top surface of the binding member 223 is preferably of such a degree that the operation protrusions 231 move to manipulate the key switches 228. In other words, the manipulation member 225 is adhered to the top surfaces of the driving protrusions 235 and an interval between the manipulation member 221 and the binding member 223 has to be equal to or larger than a minimum interval required for manipulation of the key switches 228.

The manipulation member 225 is directly exposed to outside of the portable terminal 200, but the binding member 223 or the operation member 221 is not preferably exposed to outside because it is intended to transfer user's key manipulation. Thus, the manipulation member 225 preferably has a larger area than the binding member 223 or the operation member 221.

As shown in FIGS. 5 and 6, on an inner wall of the housing 201a, more specifically, on an inner wall of the opening 212 is formed a step portion 216 for supporting the edge of the manipulation member 225. The step portion 216 protrudes inward from the inner wall of the opening 212, such that the edge of the manipulation member 225 is supported on a top surface of the step portion 216. In this case, the binding protrusions 217 protrude from end surfaces of the step portion 216 and the binding pieces 241 are assembled to closely contact the end surfaces of the step portion 216.

With reference to FIGS. 5 and 6, an assembly structure of the keypad assembly 202 will now be described in more detail.

The PCB 227 is first assembled to the rear cover 201b. The transferring portion 202a (FIG. 9) formed by coupling the operation member 221, the binding member 223, and the manipulation member 225, is assembled to the opening 212 of the housing 201a. To assemble the PCB 227 to the rear cover 201b, various structures may be formed on the rear covers 201b.

The manipulation member 225 is coupled with the operation member 221 having the binding member 223 therebetween, such that the transferring portion 202a forms a single module. When the transferring portion 202a is coupled to the housing 201a, the binding pieces 241 are engaged with the binding protrusions 217 formed on the end surfaces of the step portion 216 and the edge of the manipulation member 225 is supported on the top surface of the step portion 216. When the transferring portion 202a is assembled to the housing 201a, by forming the step portion 216 which may not be necessarily formed, assembly of the binding member 223 and disposition of the manipulation member 225 can be performed more stably.

When the PCB 227 is assembled to the rear cover 201b and the transferring portion 202a is assembled to the housing 201a, the rear cover 201b is coupled to the housing 201a, such that end portions of the binding pieces 241 are received in the avoidance grooves 219b. The support protrusions 219a are positioned to face the inner side walls of the housing 201a, more specifically, the end surfaces of the step portion 216 while having the binding pieces 241 therebetween. Hence, the binding pieces 241 are prevented from moving in a direction leaving the binding protrusions 217 or being deformed in a direction leaving the binding protrusions 217, such that the fixed state of the transferring portion 202a can be maintained stably.

The keypad assembly structured as described above includes the binding member bound to the inner side walls of the housing of the portable terminal, thus being easily assembled. Moreover, the binding pieces are formed in the binding member, such that the binding pieces are assembled and provided while closely contacting the inner side walls of the housing and parallel to the inner side walls of the housing, thereby reducing a space required for assembly of the keypad assembly. Therefore, when compared to a conventional keypad assembly, the keypad assembly according to the present invention can expand and efficiently utilize a space on which the key tops can be disposed (area of the front case), thus contributing to miniaturization of the portable terminal under the same size condition as the conventional keypad assembly.

While a detailed embodiment has been described in the present invention, it would be obvious to those of ordinary skill in the art that various changes may be made without departing from the scope of the present invention. For example, as mentioned previously, the step portion, the binding protrusions, or the binding holes may not be necessarily formed, and the binding member can be firmly coupled to the housing by engaging the binding pieces whose end portions are bent between the housing and the rear cover.

Moreover, the manipulation member includes arrangement of the key tops in a detailed embodiment of the present invention, but the manipulation member may be formed in a single flat panel form. In this case, user's manipulation may be recognized using a touch sensor instead of the key switch to generate a signal. Furthermore, when the manipulation member is formed in a single flat panel form, a substantial deformation by user's manipulation is made by the operation member, thus enabling the user to manipulate a desired key.

In addition, while the transferring portion includes the operation member, the binding member, and the manipulation member in a detailed embodiment of the present invention, the transferring portion may be in a flat panel form including a single member when a touch sensor, instead of the key switch, is disposed to generate a signal. In this case, the binding pieces may be formed on the edge of the flat panel forming the transferring portion.

Furthermore, although the keypad assembly includes the menu key, the menu shift and selection keys, and the keys for activating a message or camera function in a detailed embodiment of the present invention, the structure of the keypad assembly according to the present invention may also be applied to a keypad assembly having number/character keys or QWERTY keys of a general mobile communication terminal. In this case, variations may be made by arrangement of the key switches on the PCB and assignment of signal values to be generated by the respective key switches.

What is claimed is:

1. A keypad assembly for a portable terminal, comprising:
    a housing having inner side walls;
    an operation member deformable in response to activation of key switches;
    a binding member disposed on a top surface of the operation member, the binding member having binding pieces extending from an edge of the binding member and bent to enclose sides of the operation member;
    a manipulation member having at least one key tops disposed on a top surface of the binding member;
    one or more binding protrusions protruding from the inner side walls of the housing; and
    one or more binding holes formed in the binding pieces, the binding protrusions being engaged with the binding holes such that the binding member is fixed to the housing.

2. The keypad assembly of claim 1, wherein the portable terminal comprises a rear cover coupled to a rear surface of the housing and support protrusions formed on the rear cover to face the inner side walls of the housing, and the binding pieces are disposed between the inner side walls of the housing and the support protrusions.

3. The keypad assembly of claim 2, further comprising a printed circuit board (PCB) disposed on the rear cover and having the key buttons that are dome switches thereon, wherein operations protrusions are formed on a bottom surface of the operation member facing the dome switches.

4. The keypad assembly of claim 2, wherein the portable terminal further comprises avoidance grooves formed in the rear cover, and portions of the binding pieces are situated in the avoidance holes.

5. The keypad assembly of claim 1, further comprising:
    a plurality of operation protrusions formed on a bottom surface of the operation member; and
    a plurality of through-holes formed in the binding member in positions corresponding to the operation member.

6. The keypad assembly of claim 5, further comprising driving protrusions protruding from a top surface of the operation member, wherein each of the driving protrusions is received in one of the through-holes.

7. The keypad assembly of claim 6, wherein a plurality of key tops is disposed in positions corresponding to the driving protrusions.

8. The keypad assembly of claim 6, wherein the driving protrusions protrude from a top surface of the binding member, such that a top surface of each of the driving protrusions is adhered to a bottom surface of each of the manipulation members.

9. The keypad assembly of claim 1, wherein the portable terminal further comprises a step portion protruding inward from the inner side walls of the housing, and an edge of a bottom surface of the manipulation member is supported by a top surface of the step portion.

10. The keypad assembly of claim 9, wherein the portable terminal further comprises binding protrusions protruding from end surfaces of the step portion, and the keypad assembly further comprises binding holes formed in the binding pieces, such that the binding protrusions are engaged with the binding holes to fix the binding member to the housing.

11. A keypad assembly for a portable terminal, comprising:
    a housing;
    a printed circuit board (PCB) disposed in the housing of the portable terminal; and
    one or more binding protrusions protruding from the inner side walls of the housing;
    one or more binding holes formed in the binding pieces, the binding protrusions being engaged with the binding holes such that the binding member is fixed to the housing;
    a transferring portion for transferring a key input operation to the PCB,
    wherein the transferring portion is provided with binding pieces extending down toward the PCB, and the binding pieces are bound to inner side walls of the housing.

12. The keypad assembly of claim 11, wherein the portable terminal comprises a rear cover coupled to a rear surface of the housing and support protrusions formed on the rear cover to face the inner side walls of the housing, and the binding pieces are disposed between the inner side walls of the housing and the support protrusions.

13. The keypad assembly of claim 11, wherein the portable terminal further comprises a step portion protruding inward from the inner side walls of the housing, and the binding protrusions are formed on end surfaces of the step portion.

14. The keypad assembly of claim 11, wherein the transferring portion comprises:
    an operation member deformed according to user's manipulation to operate key switches;
    a binding member disposed on a top surface of the operation member; and
    a manipulation member disposed on a top surface of the binding member, the manipulation member comprising at least one key tops,
    wherein the binding pieces extends from on an edge of the binding member and bent to enclose sides of the operation member.

15. The keypad assembly of claim 14, further comprising:
    a plurality of key switches provided on the PCB; and
    a plurality of operation protrusions formed on the operation member facing the plurality of key switches.

* * * * *

UNITED STATES PATENT AND TRADEMARK OFFICE
CERTIFICATE OF CORRECTION

PATENT NO. : 8,772,652 B2  
APPLICATION NO. : 13/117268  
DATED : July 8, 2014  
INVENTOR(S) : Byung-Sun Kim et al.

Page 1 of 1

It is certified that error appears in the above-identified patent and that said Letters Patent is hereby corrected as shown below:

In the Claims

Column 7, Claim 1, Lines 22-23 should read as follows:  
--...one key top disposed...--

Signed and Sealed this  
Thirtieth Day of September, 2014

Michelle K. Lee  
*Deputy Director of the United States Patent and Trademark Office*